United States Patent
Crompvoets et al.

(10) Patent No.: US 9,671,090 B2
(45) Date of Patent: Jun. 6, 2017

(54) LIGHTING DEVICE FOR OBTAINING A PREDETERMINED LIGHT DISTRIBUTION AT A TARGET AREA

(71) Applicant: PHILIPS LIGHTING HOLDING B.V., Eindhoven (NL)

(72) Inventors: Floris Maria Hermansz Crompvoets, Bunde (NL); Wiebe Wagemans, Eindhoven (NL); Marc Matysek, Hofheim (DE)

(73) Assignee: PHILLIPS LIGHTING HOLDING B.V., Eindhoven (NL)

( * ) Notice: Subject to any disclaimer, the term of this patent is extended or adjusted under 35 U.S.C. 154(b) by 105 days.

(21) Appl. No.: 14/415,874

(22) PCT Filed: Jul. 20, 2013

(86) PCT No.: PCT/IB2013/055969
§ 371 (c)(1),
(2) Date: Jan. 20, 2015

(87) PCT Pub. No.: WO2014/013477
PCT Pub. Date: Jan. 23, 2014

(65) Prior Publication Data
US 2015/0167933 A1    Jun. 18, 2015

Related U.S. Application Data

(60) Provisional application No. 61/673,915, filed on Jul. 20, 2012.

(51) Int. Cl.
*G02B 1/06* (2006.01)
*F21V 14/00* (2006.01)
(Continued)

(52) U.S. Cl.
CPC .............. *F21V 14/00* (2013.01); *F21S 8/085* (2013.01); *F21V 13/00* (2013.01); *F21V 14/003* (2013.01);
(Continued)

(58) Field of Classification Search
CPC ....................................................... F21V 14/00
(Continued)

(56) References Cited

U.S. PATENT DOCUMENTS

| 7,209,280 B2 | 4/2007 | Goossens |
| 7,915,789 B2 | 3/2011 | Smith |

(Continued)

FOREIGN PATENT DOCUMENTS

| WO | 2011018728 A1 | 2/2011 |
| WO | 2011138735 A1 | 11/2011 |

(Continued)

OTHER PUBLICATIONS

Ronald E. Pelrine et al; "Electrostriction of Polymer Dielectrics With Compliant Electrodes as a Means of Actuation", Sensors and Actuators A, Physical vol. 64, No. 1, 1998, pp. 77-85.
(Continued)

*Primary Examiner* — James Jones (57) ABSTRACT

The invention relates to a lighting device (100) comprising a light source (110) and an optical component (120) adapted for obtaining a predetermined light distribution (300) at a target area (400). The optical component has a substrate (122) comprising a material that is capable of controllably changing shape when an activating force is applied thereto, and one or more optical elements (121). The substrate further comprises a material capable of being switched from a first state comprising a first static modulus to a second state comprising a second static modulus by means of an external stimulus (140), the first static modulus being smaller than (Continued)

the second static modulus, the static modulus being calculated as the ratio of strain to stress of the substrate under static conditions. This material is capable of controllably changing shape in the first state and being dimensionally stable in the second state, when no activating force is applied thereto.

15 Claims, 4 Drawing Sheets

(51) Int. Cl.

| | | |
|---|---|---|
| *F21V 23/04* | (2006.01) | |
| *F21S 8/08* | (2006.01) | |
| *F21V 13/00* | (2006.01) | |
| *F21V 23/00* | (2015.01) | |
| *F21V 14/06* | (2006.01) | |
| *G02B 26/08* | (2006.01) | |
| *F21W 131/103* | (2006.01) | |

(52) U.S. Cl.
CPC ............ *F21V 14/06* (2013.01); *F21V 23/003* (2013.01); *F21V 23/045* (2013.01); *F21V 23/0478* (2013.01); *G02B 26/0808* (2013.01); *F21W 2131/103* (2013.01)

(58) Field of Classification Search
USPC ........................................................ 359/665
See application file for complete search history.

(56) References Cited

U.S. PATENT DOCUMENTS

| | | |
|---|---|---|
| 2005/0088750 A1 | 4/2005 | Hasei |
| 2009/0161239 A1* | 6/2009 | Verhaar ............... H01L 41/0986 359/824 |
| 2010/0134047 A1 | 6/2010 | Hasnain |
| 2010/0171393 A1 | 7/2010 | Pei et al. |
| 2010/0296294 A1 | 11/2010 | Ackermann et al. |
| 2011/0267680 A1 | 11/2011 | Aschwanden |

FOREIGN PATENT DOCUMENTS

| | | |
|---|---|---|
| WO | 2012027851 A1 | 3/2012 |
| WO | 2012032447 A1 | 3/2012 |
| WO | WO2012097163 A1 | 7/2012 |

OTHER PUBLICATIONS

Kaori Yuse et al; "Development of Large-Strian and Low-Powered Electro-Active Polymers (EAPs) Using Condutive Fillers", Sensors and Actuators, Aug. 8, 2010, SNA 7070, pp. 1-34.

Qibing Pei et al; "Electroactive Polymers for Rigid-to-Rigid Actuation and Braille E-Books", SPIE Newsroom 2010, 10.1117/2.1201002.002632, pp. 1-2.

* cited by examiner

*Fig. 5d* ic # LIGHTING DEVICE FOR OBTAINING A PREDETERMINED LIGHT DISTRIBUTION AT A TARGET AREA

CROSS-REFERENCE TO PRIOR APPLICATIONS

This application is the U.S. National Phase application under 35 U.S.C. §371 of International Application No. PCT/IB13/055969, filed on Jul. 20, 2013, which claims the benefit of U.S. Provisional Patent Application No. 61/673,915, filed on Jul. 20, 2012. These applications are hereby incorporated by reference herein.

FIELD OF THE INVENTION

The invention relates to a lighting device comprising a light source and an optical component adapted for obtaining a predetermined light distribution at a target area, the optical component comprising a substrate, the substrate comprising a material being capable of controllably changing shape when an activating force is applied thereto, and one or more optical elements.

BACKGROUND OF THE INVENTION

Lighting devices of the above mentioned kind are used in luminaires in principle of any indoors or outdoors type, but particularly luminaires for outdoor lighting applications. Flexibility in placement of luminaires is very much desired. For instance for outdoor lighting, city architects are bound to mount luminaires on a pole at a fixed position relative to the ground in order to obtain a desired or required light distribution at a target area. Thus, the possibility to set the light distribution is limited to choosing the position on a pole before fixing the luminaire in that position. This in turn results in a clutter of light poles which is not desirable. More flexibility in placement has already been gained by suspending the luminaires from a wire but this still disturbs the street view with a crisscross of wires.

US-2010/029694 A1 describes a lighting device comprising a reflective electroactive polymer which is activated by means of a voltage control arrangement with a spatially varying voltage distribution. Thereby the shape of the reflective surface of the electroactive polymer can be continuously adapted to the given requirements.

Such a lighting device provides for an increased adaptability to the requirements given. However, such a lighting device has the drawback of requiring continuous application of a voltage for as long as a desired or required light distribution at a target area needs to be provided. This in turn results in high energy consumption and a less robust lighting device.

The term "target area" as used herein is intended to encompass any outdoor or indoor surface needing illumination as well as any temporary or virtual area at which the light distribution, preferably the angular intensity distribution of the light, is measured as a part of setting up a lighting device according to the invention. As an example, target areas in connection with outdoor luminaires may be for example outdoor surfaces such as streets, lanes, cycle paths, pavements, footpaths and like infrastructural surfaces.

The term "optical element" as used herein is intended to encompass any optical element usable for altering the path of the light beams emitted by a light source. Particularly, however, the term optical element is intended to encompass any one or more of a light reflective element, a light refractive element, a light diffractive element and a combination thereof.

As used herein, the term "first state" refers to a state in which the material of the substrate of the optical component comprises a first static modulus and is capable of changing shape when subjected to an activating force. Likewise, the term "second state" as used herein refers to a state in which the material of the substrate of the optical component comprises a second elastic modulus and is dimensionally stable. The first and second states are furthermore defined by that the first static modulus is smaller than the second static modulus. It is noted, that the static modulus of a material is generally calculated as the ratio of strain to stress of the material under static conditions.

SUMMARY OF THE INVENTION

It is an object of the present invention to overcome this problem, and to provide a robust lighting device enabling more flexibility in placement by obtaining a desired or required light distribution at a target area while keeping the energy consumption low.

According to a first aspect of the invention, this and other objects are achieved with a lighting device as described initially and in which the substrate furthermore comprises a material capable of being switched from a first state comprising a first static modulus to a second state comprising a second static modulus by means of an external stimulus, the first static modulus being smaller than the second static modulus, the static modulus being calculated as the ratio of strain to stress of the substrate under static conditions, the material being capable of controllably changing shape in the first state and being dimensionally stable in the second state, when no activating force is applied thereto.

Thereby a lighting device is achieved with which the optical element of the lighting device can be set in a certain desired state during commissioning and then be fixed in that state. This gives the lighting architect the freedom not only to place a number of identical luminaires with such lighting devices to cover an area, for example a street, to be illuminated, but also to customize the illumination profile, i.e. the light distribution at a target area, of each lighting device of each luminaire upon commissioning. This relieves the strong link between the position of a certain luminaire and the area that is illuminated, thus providing a large flexibility in placement of the luminaires.

Furthermore, a continuously working activating force is no longer needed, which provides for a considerably simpler, more robust and energy efficient lighting device.

In an embodiment the activating force is a voltage applied to the material of the substrate. Thereby, a lighting device having a particularly simple construction is provided.

In an embodiment the lighting device further comprises a controller for controlling the shape and/or state of the optical component.

Thereby a lighting device is provided, with which the light distribution may be adjusted in a controlled manner providing for an exact adjustment.

In an embodiment the lighting device further comprises a sensor for measuring the light distribution at the target area.

Thereby a lighting device is provided, with which the light distribution at the target area may be monitored to ensure that a correct adjustment according to the requirements given is achieved at the target area.

In an embodiment the controller controls the shape and/or state of the optical component based on a signal obtained by the sensor and submitted to the controller.

Thereby a lighting device is provided, with which the advantages of a controller and a sensor is combined to provide a particularly simple, efficient and precise adjustment procedure.

The sensor may be any one or more of a photodetector, a camera and a naked eye. The signal obtained by the sensor may be submitted to the controller by any suitable means, such as for example automatically over a wired or wireless connection, or by means of being inputted through a suitable interface.

In an embodiment the controller comprises at least one electrode and at least one electrical power source.

Thereby a lighting device having a simple construction is provided, with which the light distribution may be adjusted in a particularly simple and convenient manner, simply by adjusting the voltage applied to the electrodes by means of the power source.

Preferably, the controller comprises a first electrode arranged on a first surface of the substrate and a second electrode arranged on a second surface of the substrate opposite the first surface.

Thereby a lighting device having a simple construction is provided, with which the light distribution may be adjusted in a particularly simple and convenient manner, simply by adjusting the voltage applied to the electrodes.

In another embodiment the controller comprises a first electrode and a third electrode arranged on a first surface at opposite ends of the substrate and a second electrode and a fourth electrode arranged on a second surface at opposite ends of the substrate opposite the first surface.

In this embodiment the voltage applied to each pair of electrodes need not necessarily be identical, but may just as well be different, thus providing for a further parameter with which to adjust the light distribution of the lighting device in that a non-linear change of shape may be obtained.

In an embodiment the first, second, third and/or fourth electrodes are segmented electrodes.

Thereby a lighting device is provided, with which the shape of the substrate may be changed in more than one spatial dimension simultaneously. If, for instance, each of the segmented electrode pairs are applied a different voltage increasing in a direction from the center of the substrate towards either of the edges, a curved shape having a U-like or even bowl-like shape may be obtained.

In an embodiment the external stimulus is one or more of heat and UV radiation, whereby a simple way of fixing the substrate of the lighting device is provided. Furthermore a source providing such an external stimulus may in principle be removed from the lighting device after use to be reused on another lighting device, thus reducing the costs.

In an embodiment the external stimulus is provided by the light source. This may be obtained by causing the light source to emit heat by being temporarily caused to emit radiation with an intensity above a predetermined intensity with which the light source emits under normal working conditions, and/or by means of the light emitted by the light source as such in that the intensity with which the light source emits is increased or by illuminating the substrate material for a sufficiently long time.

Thereby, a lighting device with a particularly simple structure is provided with which the substrate of the lighting device may be fixed in the desired position or state in a particularly simple manner as a separate source of external stimulus may be omitted.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

In the drawings.

DETAILED DESCRIPTION OF THE EMBODIMENTS

Figure 1:
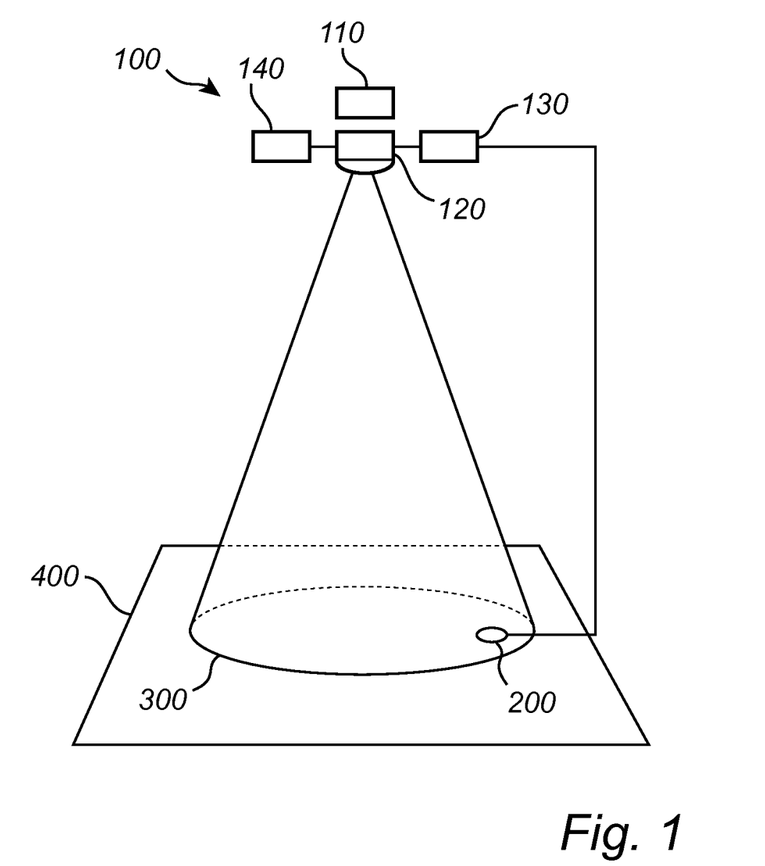
FIG. 1 shows a schematic diagram of a lighting device according to the invention in an embodiment comprising a controller, a sensor and a means for providing external stimulus and illuminating a target area with a desired light distribution.

FIG. 1 shows an embodiment of a lighting device 100 according to the invention.

The lighting device 100 according to the invention generally comprises a light source 110 and an optical component 120. The optical component 120 comprises a substrate 122 and an optical element 121 arranged on a surface of the substrate 122 intended for facing away from the light source 110. The substrate 122 and the optical element 121 may be separate elements, or alternatively the substrate and the optical element may be one and the same element.

The light source 110 may be any feasible type of light source, for example one or more LEDs or light bulbs, or even an array of light sources. The light source 110 may be arranged on either side of the optical component 120. Preferably, however, the light source 110 is arranged such that light emitted there from first propagates through the substrate 122 of the optical component 120 and then propagates through and/or is reflected by the optical element 121 of the optical component 120 to illuminate a predetermined surface area 300 of a target area 400. The light source 110 may be arranged on the optical component 120 or, and preferably, in a distance there from.

The optical element 121 may in principle be any type of optical element. For instance the optical element 121 may be a reflector, a lens, a mirror, a grating, a prism, a diffuser or a combination thereof. The optical element 121 may be a rigid element or it may be a flexible element allowing for it to changes its shape along with the substrate 122. The substrate 122 comprises a material which controllably changes shape when subjected to an activating force, for example when a voltage is applied thereto, which can be switched from a first state comprising a first static modulus to a second state comprising a second static modulus by means of an external stimulus, and which can be fixed in a dimensionally stable manner in at least the second state. In principle, the material may also be dimensionally stable in the first state when no activating force is applied thereto.

Materials fulfilling these properties are for example bistable electroactive polymers (EAP), bistable dielectric electroactive polymers, bistable electroactive elastomers and bistable dielectric electroactive elastomers (DEA). Also, the material may be a thermosetting material, preferably polymer or elastomer, or a UV hardening material, preferably polymer or elastomer.

As shown in FIG. 1, the lighting device furthermore comprises a controller 130, a means 140 for providing an external stimulus and a sensor 200.

The means 140 for providing an external stimulus may be any source of an external stimulus capable of fixing the substrate 122 in the second state. Preferably, the means 140 is a means for providing heat or UV radiation or a combination thereof, such as a heating element or a UV radiation source. Another possibility is to use means 140 in the form of an electrical resistance to provide the external stimulus by resistive heating, wherein the electrical resistance can be removed and re-used for other lighting devices. The means 140 for providing an external stimulus is arranged such as to provide the external stimulus to the substrate 122 of the optical component 120.

In an alternative, the external stimulus is provided by the light source 110 being temporarily caused to emit radiation with an intensity above a predetermined intensity with which the light source emits under normal working conditions.

The controller 130, an embodiment of which will be described in further detail below with reference to FIGS. 2-5, may generally be any type of controller adapted for causing the substrate 122 of the optical component 120 to change shape.

The controller 130 is preferably an electrically activated controller based on electrodes as described in detail below. Alternatively, the controller 130 may be a mechanically activated controller based for example on springs, magnets or any other means suitable for changing the shape of the substrate 122 by applying an activating force thereto. It is even feasible, that the shape of the substrate 122 may be changed by hand, i.e. the controller may be the fingers or hands of a user employed for manually changing the shape of the substrate 122 and for holding the desired shape while exposing the substrate 122 to the external stimulus.

The sensor 200 may be any type of photodetector feasible, but is preferably a camera or the naked eye of a user mounting the lighting device. The sensor 200 is arranged at or close to the target area 400 to be illuminated with the predetermined light distribution 300.

The controller 130 controls the shape and/or state of the substrate 122, and thereby of the optical component 120, based on a signal obtained by the sensor 200 and submitted to the controller 130. The signal obtained by the sensor 200 is submitted to the controller 130 by any suitable means. If the controller 130 is an electrically activated controller, and the sensor 200 is an electronic sensor, such as a camera, comprising a means for transmitting a signal, the submission of signals is preferably carried out automatically over a wired or wireless connection. If the sensor 200 on the other hand is for example a naked eye, the submission may be carried out by means of data being inputted through a suitable interface, such as a keyboard or an adjustment knob, provided in connection with the controller 130.

The sensor 200, the controller 130 and the means 140 for providing an external stimulus may be stationary elements provided on the lighting device 100. In this case it is feasible, that the sensor 200, the controller 130 and the means 140 for providing an external stimulus may be employed for readjustment of the light distribution of lighting device 100 in case of changed requirements and/or a changed position of the lighting device.

Alternatively any one or more of the sensor 200, the controller 130 and the means 140 for providing an external stimulus may be provided such as to be removable from the lighting device 100. In this case these components may be reused for the adjustment of other lighting devices 100. This embodiment provides for a lighting device being particularly simple and cost efficient, and it is particularly advantageous for use where it is necessary to install and adjust a large number of luminaires with such lighting devices.

A desired light distribution 300 at a target area 400 may according to the invention be obtained in the following way: Firstly, a lighting device 100 according to the invention is provided and mounted in a desired location. The desired target area 400 is illuminated with the light source 110 and the light distribution at the target area 400 is measured, preferably by means of the sensor 200. Values for the desired light distribution 300 and the measured light distribution are compared. The shape of the optical component 120, the substrate material of which is in the first state, of the lighting device 100 is adjusted based on the comparison to reduce the deviation between the desired light distribution 300 and the measured light distribution to being below a predetermined limit, preferably by activating the controller 130. Finally the optical component 120 is fixed in a position corresponding to the adjusted shape of the optical component 120 by means of an external stimulus switching the substrate material of the optical component 120 to the second state.

Turning now to FIGS. 2a, 2b, 3a and 3b an optical component 120 of a lighting device 100 according to the invention, the lighting device 100 comprising a controller 130, is shown. The controller 130 is adapted for stretching the substrate 122 of the optical component 120 in at least one direction x, y (see FIG. 2b) being substantially parallel to a first surface 11 of the substrate 122 adjoining the optical element 121.

Figure 2A:
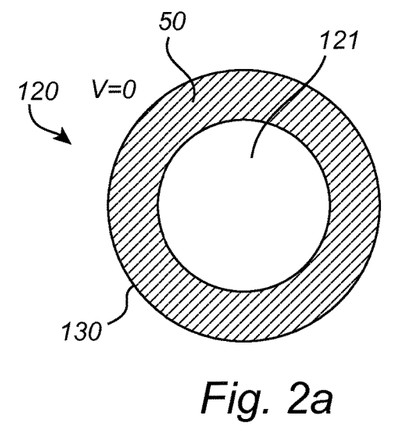
FIGS. 2a and 2b show a top view of an optical component of a lighting device according to FIG. 1 in a second state with an unchanged shape of the substrate and a second state with a changed shape of the substrate, respectively, the optical component being provided with a controller in the form of a pair of circular electrodes.
Figure 2B:
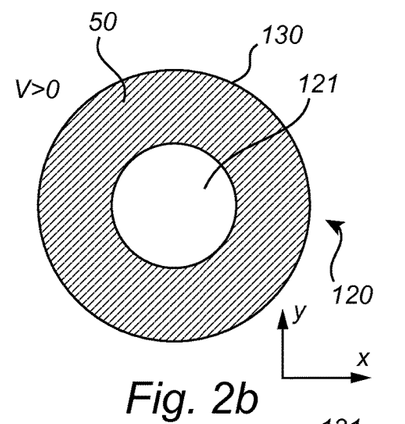

In the embodiment shown in FIGS. 2a and 2b, the controller 130 comprises a pair of circular electrodes 50 and an electrical power source (not shown), and the substrate 122 comprises a bistable electroactive elastomer or polymer. A first circular electrode 51 is arranged along a periphery of the substrate 122 of the optical component 120 which is likewise circular of shape, on the first surface 11 of the substrate 122, and encircling the optical element 121. A second circular electrode (not shown) is arranged in a similar way on an opposite second surface 12 of the substrate 122 of the optical component 120. When applying a voltage to the pair of circular electrodes (FIG. 2b) the part of the substrate 122 being arranged between the electrodes is stretched, and the part of the optical component inside the circular electrode is consequently pushed towards the center. Thereby the optical element 121, and thus the optical component 120, changes shape to a circular structure with a smaller diameter. In the embodiment shown in FIGS. 2a and 2b, the optical element 121 may be stretched in all directions falling within the plane of the first surface 11 simultaneously.

It is noted that the pair of electrodes may in principle have any shape, for example rectangular or triangular, conforming to following the periphery of the substrate of the optical component. Also, electrodes that extend along substantially the whole periphery of the substrate of the optical component, i.e. that are missing one or more segments, are feasible.

Figure 3A:
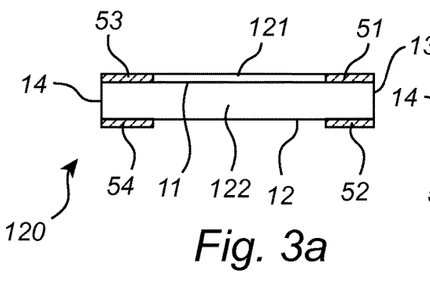
FIGS. 3a and 3b show a side view of another optical component of a lighting device according to FIG. 1 in a second state with an unchanged shape of the substrate and a first state with a changed shape of the substrate, respectively, the optical component being provided with a controller in the form of two pairs of electrodes and a power source.
Figure 3B:
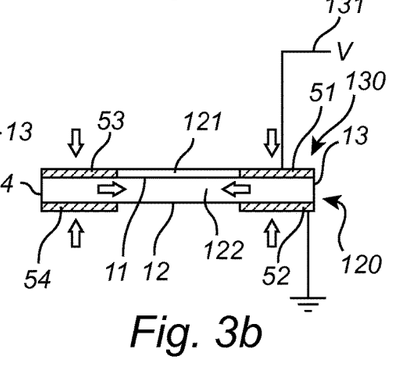

In the embodiment shown in FIGS. 3a and 3b, the substrate 122 comprises a bistable electroactive elastomer or polymer and the controller 130 comprises a voltage source 131 and a first electrode 51 and a second electrode 52 arranged on the first surface 11 and on the second surface 12, respectively, at the first end 13 of the substrate 122 thus forming a first pair of electrodes 51, 52. The controller 130 furthermore comprises a third electrode 53 and a fourth electrode 54 arranged on the first surface 11 and on the second surface 12, respectively, at the second end 14 of the substrate 122, thus forming a second pair of electrodes 53, 54. When applying a voltage to the respective pairs of electrodes 51, 52; 53, 54 the part of the substrate being arranged sandwiched between the respective pairs of electrodes is stretched, and the part of the optical component 120, including the optical element 121, arranged centrally between the pairs of electrodes is consequently pushed towards the middle of the optical component 120, primarily in a direction extending between the pairs of electrodes.

Preferably, the electrodes are stretchable electrodes made of a material being compliant enough not to restrict actuator movement and deformable enough not to break or fail during actuation. Such electrodes may for example be thin film electrodes coated or printed on the first layer of the diffuser.

Thus, the controller 130 shown in FIGS. 2a, 2b, 3a and 3b are essentially different embodiments of a so-called bistable dielectric electroactive polymer (bistable DEA) actuator integrated with an optical component 120.

DEA actuators are a type of actuator known per se, for example from the article of Z. Yu et al. in Applied Physics Letters 95, 192904, 2009, which generally speaking are thin film actuators consisting of a sandwich of traditionally two stretchable electrodes with a soft elastomer in between. The stretchable electrodes are compliant enough not to restrict actuator movement and deformable enough not to break or fail during actuation. The basic functionality of a polymer actuator is a controllable stretch motion under influence of a driving voltage. When applying a voltage, the stretchable electrode surfaces of a DEA actuator grow larger while the thickness of soft elastomer becomes smaller due to incompressibility of the elastic polymer. The actuation is based on electrostatic pressure balanced by mechanical pressure and works as follows. When a voltage, and thereby an additional charge, is applied to the electrodes, the electrodes will attract each other and the distance between them decreases by an amount depending on the magnitude of the additional charge. An equilibrium state is reached when the electrostatic pressure is counterbalanced by the mechanical pressure of the compressed soft elastomer.

Bistable electroactive polymers are polymers which may be switched between two states (actuated and non-actuated) and stay in those states without the need to sustain an electric field that is normally used for the actuated state. The essence of these bistable DEAs is that a transition is made during the actuation from the first state to the second state of the material. This transition can be triggered by for instance heat. Alternatively, the trigger can be light of the proper wavelength and intensity.

As a further possibility, the electrodes may be segmented electrodes, i.e. electrodes comprising two or more mutually separated segments. Also, the electrodes may in principle have any feasible shape.

Naturally any number of electrodes or electrode pairs may in principle be provided, including one pair and three or more pairs. Also, all electrode pairs need not necessarily be applied the same voltage.

Turning now towards FIGS. 4a to 4d and 5a to 5d, an optical component 120 of a lighting device 100 according to FIG. 1 and comprising a controller 130 with electrodes 51, 52; 53, 54 and a power source 131 is shown in two different embodiments illustrating four stages in the process of adjusting the light distribution of the lighting device 100. In each of FIGS. 4a to 4d and FIGS. 5a to 5d, four stages in the process are shown.

In FIGS. 4a to 4d the stages are
4a) a second state with an unchanged shape of the substrate,
4b) a first state with an unchanged shape of the substrate,
4c) a first state with a changed shape of the substrate, and
4d) a second state with a changed shape of the substrate.

In FIGS. 5a to 5d the stages are
5a) a first state with an unchanged shape of the substrate,
5b) a first state with an changed shape of the substrate,
5c) a transition phase from the first state to a second state with a changed shape of the substrate, and
5d) a second state with a changed shape of the substrate.

The embodiments shown differ in respect of the type of shape change inflicted upon the substrate 122 of the optical component 120 and the type of external stimulus used to fix the substrate 122 of the optical component 120. Furthermore, the system shown in FIGS. 4a to 4d is reversible, while the system shown in FIGS. 5a to 5d is irreversible.

Referring to FIGS. 4a to 4d, the shape change inflicted is a planar stretching of the substrate 122, and the external stimulus used is heat, thus taking advantage of the glass-rubber transition of the substrate material. It is noted that for simplicity only the substrate 122 of the optical component 120 is shown on FIG. 4.

Figure 4A:
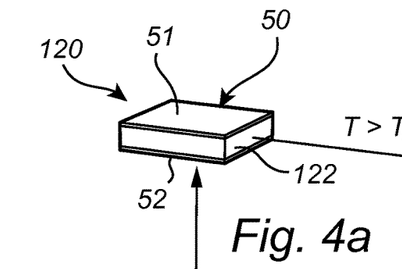
FIGS. 4a to 4d show a schematic representation of an optical component of a lighting device according to FIG. 1, represented as being a) in a second state with an unchanged shape of the substrate, b) in a first state with an unchanged shape of the substrate, c) in a first state with a changed shape of the substrate, and d) in a second state with a changed shape of the substrate, the shape change being a planar stretching of the substrate and the respective transitional conditions being indicated.

Starting from stage 4a), an optical component 120 is shown in the second state with a high elastic modulus and a stiff substrate 122, the substrate material being in the glass phase and having its original unchanged shape.

Figure 4B:
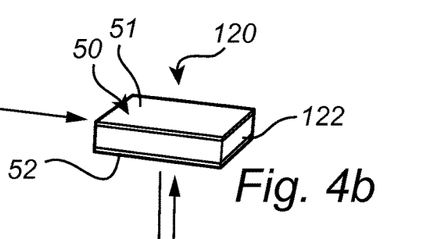

To get to stage 4b), the external stimulus is employed to cause the temperature T of the substrate 122 to rise above the glass temperature $T_g$ of the substrate material. Thereby the optical component 120 is switched from the second state to a first state with a low elastic modulus and a soft substrate 122, as the substrate material undergoes a transition from the glass phase to the rubber phase.

Figure 4C:
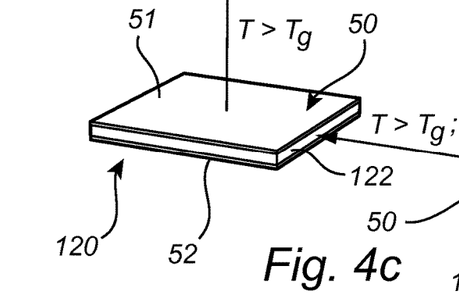

To further get to stage 4c) the temperature T of the substrate is kept above the glass temperature $T_g$, the optical component 120 thus being kept in the first stage. The voltage source 131 of the controller 130 is turned on to apply a voltage V to the electrode 51, the opposite electrode 52 being grounded. The voltage V causes the material of the substrate 122 of the optical component 120 to stretch in all directions parallel with the plane of the electrodes 51, 52, thus changing the shape of the optical component by increasing the area of the part of the substrate 122 arranged between the electrodes 51, 52 while simultaneously causing the substrate 122 to become thinner.

Figure 4D:
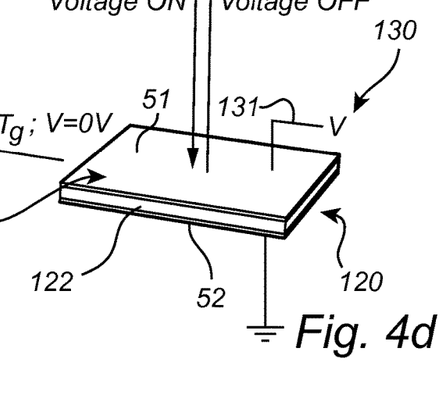

Finally, to get to stage 4d), the temperature T of the substrate is lowered to below the glass temperature $T_g$, and the substrate material undergoes a transition from the rubber phase to the glass phase thus switching the optical component 120 to the second stage. Simultaneously, the voltage source 131 is kept turned on. Thereby the substrate 122, and thus the optical component 120, is fixed in a dimensionally stable manner in the second state, the changed shape being maintained. When the temperature is well below the glass temperature $T_g$, the voltage source 131 is turned off.

It is noted, that the process in FIGS. 4a to 4d may be used as both a reversible process and a non-reversible process. The process may be made reversible by heating the elastomer again above the glass temperature where it will relax to its original shape in the absence of an electric field.

Referring now to FIGS. 5a to 5d, the substrate 122 and the optical element 121 are one integral element. The shape change inflicted on the optical component 120 is in this case a change from a planar optical component 120 to an optical component 120 with two bulges or substantially convex surfaces. The external stimulus used is ultraviolet (UV) radiation.

Figure 5A:
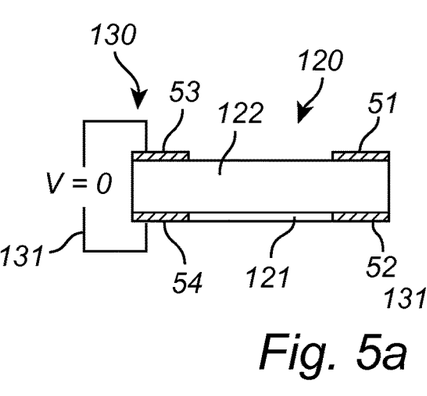
FIGS. 5a to 5d show a schematic representation of another optical component of a lighting device according to FIG. 1, represented as being a) in a first state with an unchanged shape of the substrate, b) in a first state with a changed shape of the substrate, c) in a transition between a first state and a second state with a changed shape of the substrate, and d) in a second state with a changed shape of the substrate, the shape change providing the substrate with convex opposite surfaces and the respective transitional conditions being indicated.

Starting from stage 5a), the optical component 120 is shown in the first state with a low elastic modulus and a soft substrate material, the substrate material being in an unhardened phase and having its original unchanged shape. The substrate material is thus dimensionally stable in the first state.

Figure 5B:
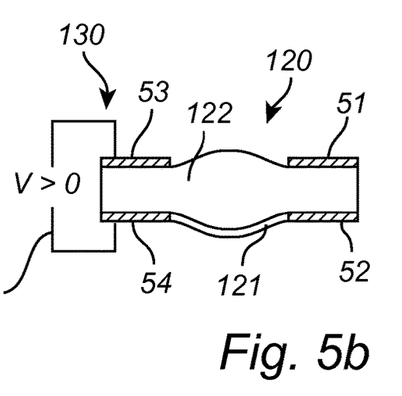

To get to stage 5b), the substrate material is kept soft, the optical component 120 thus being kept in the first state. The voltage source 131 of the controller 130 is turned on to apply a voltage V to each pair of electrodes 51, 52 and 53, 54. The voltage V causes the material of the substrate 122 of the optical component 120 arranged between electrodes 53 and 54 and between electrodes 51 and 52 to stretch in all directions parallel with the plane of the electrodes, thus changing the shape of the optical component 120 by pushing the part of the substrate 122 arranged between the respective electrode pairs 51, 52; 53, 54 together, thereby causing the optical component 120 to bulge out or obtain convex surfaces.

Figure 5C:
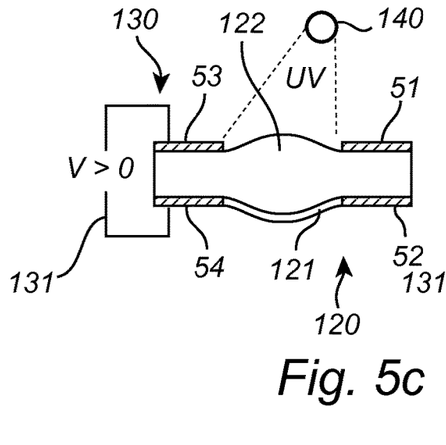

In stage 5c) the external stimulus, being a source of UV radiation 140, is turned on to expose the substrate material to UV radiation and thereby to cause the substrate material to harden. Thereby the optical component 120 is switched from the first state to a second state with a high elastic modulus and a stiff substrate material. Simultaneously, the voltage source 131 is kept turned on. Thereby the substrate material and thus the optical component 120, is fixed in the second state, the changed shape being maintained.

Figure 5D:
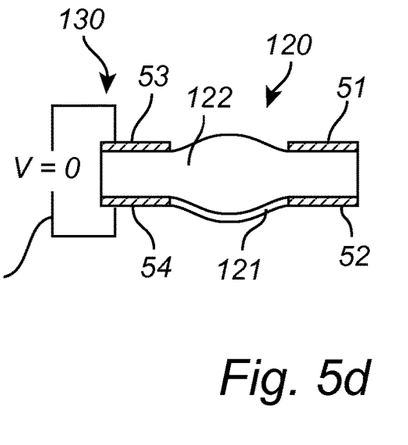

Finally, to get to stage 5d), the source of UV radiation 140 and the voltage source 131 of the controller 130 are turned off. Thereby the substrate material, and thus the optical component 120, is fixed in the second state, the changed shape being maintained.

The process illustrated in FIGS. 5a to 5d is normally a non-reversible process.

The person skilled in the art realizes that the present invention by no means is limited to the preferred embodiments described above. On the contrary, many modifications and variations are possible within the scope of the appended claims. It is for example noted that the possible applications of this invention is not limited to lighting devices. For instance in embodiments where the optical element is a grating, an interesting application is an optical device for use in a spectroscopy system.

The invention claimed is:

1. A lighting device comprising:
a light source, and
an optical component adapted to direct light of the light source to obtain a predetermined light distribution at a target area, wherein the optical component comprises:
a substrate that changes shape in response to an activating force applied thereto, wherein the substrate is switchable from a first state to a second state by means of an external stimulus, the substrate having a first static modulus in the first state and a second static modulus in the second state, the first static modulus being less than the second static modulus, the substrate being dimensionally stable in the second state when no activating force is applied thereto, and
one or more optical elements on the substrate, and
a sensor for measuring the light distribution at the target area.

2. The lighting device according to claim 1, wherein the activating force is a voltage applied to the substrate.

3. The lighting device according to claim 1, wherein the substrate comprises a material selected from the group consisting of a bistable electroactive polymer, a bistable dielectric electroactive polymer, a bistable electroactive elastomer and a bistable dielectric electroactive elastomer.

4. The lighting device according to claim 1, wherein the substrate comprises a thermosetting material or a UV hardening material.

5. The lighting device according to claim 1, further comprising a controller for controlling the shape or state of the optical component.

6. The lighting device according to claim 1, wherein the sensor is a photodetector or a camera.

7. The lighting device according to claim 5, wherein the controller is arranged to control the shape or state of the optical component based on a signal obtained by the sensor and submitted to the controller.

8. The lighting device according to claim 5, wherein the controller comprises at least one electrode and at least one electrical power source.

9. The lighting device according to claim 8, wherein the controller comprises a first electrode arranged on a first surface of the substrate and a second electrode arranged on a second surface of the substrate opposite said first surface.

10. The lighting device according to claim 8, wherein the controller comprises a first electrode and a third electrode arranged on a first surface at opposite ends of the substrate, and a second electrode and a fourth electrode arranged on a second surface at opposite ends of the substrate opposite said first surface.

11. The lighting device according to claim 10, wherein the first, second, third, and fourth electrodes are segmented electrodes.

12. The lighting device according to claim 1, wherein the external stimulus is provided by the light source.

13. The lighting device according to claim 1, wherein the one or more optical elements comprise one or more of a light reflective element, a light refractive element, a light diffractive element, and a combination thereof.

14. The lighting device of claim 1, the external stimulus is one or more of heat and UV radiation.

15. The lighting device of claim 1, wherein the first static modulus and the second static modulus are calculated as a ratio of strain to stress of the substrate under static conditions.

* * * * *